United States Patent [19]

Happich

[11] Patent Number: 5,565,053
[45] Date of Patent: Oct. 15, 1996

[54] METHOD OF MANUFACTURING A PLASTIC MOLDING

[75] Inventor: Otto Happich, Wuppertal, Germany

[73] Assignee: Gebr. Happich GmbH, Germany

[21] Appl. No.: 383,618

[22] Filed: Feb. 2, 1995

Related U.S. Application Data

[63] Continuation of Ser. No. 88,835, Jul. 8, 1993, abandoned.

[30] Foreign Application Priority Data

Jul. 30, 1992 [DE] Germany .................. 42 25 161.3

[51] Int. Cl.⁶ ...................................... B29C 45/14
[52] U.S. Cl. ................... 156/216; 264/266; 264/295
[58] Field of Search .................. 264/259, 266, 264/267, 279, 46.4, 509, 510, 511, 513, 294, 248, 295, 296; 425/112, 116, 129.1; 156/214, 216, 245, 308.2

[56] References Cited

U.S. PATENT DOCUMENTS

| | | | |
|---|---|---|---|
| 3,657,044 | 4/1972 | Singer | 264/510 |
| 3,755,031 | 8/1973 | Hoffman et al. | 156/245 |
| 4,046,611 | 9/1977 | Sanson | 264/46.4 |
| 4,338,148 | 7/1982 | Adell | 156/216 |
| 4,670,073 | 6/1987 | Langley | 156/216 |
| 4,744,592 | 5/1988 | Barnette et al. | 156/216 |
| 4,873,036 | 10/1989 | Urai | 264/46.4 |
| 4,873,041 | 10/1989 | Masui et al. | 264/266 |
| 4,978,407 | 12/1990 | Ardissone | 264/248 |
| 4,992,244 | 2/1991 | Swenson et al. | 264/46.6 |
| 5,007,815 | 4/1991 | Shoji | 264/46.6 |
| 5,066,344 | 11/1991 | Inami et al. | 264/266 |
| 5,122,320 | 6/1992 | Masui et al. | 264/266 |
| 5,130,074 | 7/1992 | Sakamoto et al. | 264/259 |
| 5,182,065 | 1/1993 | Piotrowski et al. | 264/266 |
| 5,223,201 | 6/1993 | Masui et al. | 264/266 |
| 5,238,640 | 8/1993 | Masui et al. | 264/266 |

FOREIGN PATENT DOCUMENTS

| | | |
|---|---|---|
| 0079017 | 5/1983 | European Pat. Off. . |
| 0466180 | 7/1991 | European Pat. Off. . |
| 0480153 | 8/1991 | European Pat. Off. . |
| 466180 | 1/1992 | European Pat. Off. . |
| 480153 | 4/1992 | European Pat. Off. . |
| 0480153 | 4/1992 | European Pat. Off. . |
| 1256527 | 3/1965 | Germany . |
| 2114886 | 3/1971 | Germany . |
| 2925500 | 6/1979 | Germany . |
| 2941086 | 10/1979 | Germany . |
| 3634596 | 10/1986 | Germany . |
| 3921031 | 6/1989 | Germany . |
| 3930603 | 9/1989 | Germany . |
| 2057967 | 4/1981 | United Kingdom . |
| 2195940 | 4/1988 | United Kingdom . |
| 2229133 | 3/1990 | United Kingdom . |

OTHER PUBLICATIONS

*Patent Abstracts of Japan*, 1–171836(A), vol. 13, No. 446 (M–877)(3794), Oct. 6, 1989.
European Search Report, Nov. 16, 1993.

*Primary Examiner*—Jan H. Silbaugh
*Assistant Examiner*—Angela Ortiz
*Attorney, Agent, or Firm*—Ostrolenk, Faber, Gerb & Soffen, LLP

[57] ABSTRACT

A method of manufacturing a plastic molding having a web of decorative material as a covering. The web is larger than the molding in at least one direction defining a protrusion beyond at least one edge of the molding to be made. A plasticized plastic composition is fed in plasticized condition to an open mold cavity of a mold consisting of lower and upper mold halves. The web is placed over the composition in the mold. The molding is compressed into shape by closing the mold over the composition and against the web of decorative material arranged between the mold halves. Over the protrusion, the mold defines a skin of the plastic. The plasticized plastic composition is compression molded, at least in regions also against the protrusion of the web of decorative material, forming the skin. The protrusion is turned around the edges of the molding after the hardening thereof, and the protrusion with its skin is heat welded to the edge or rear of the molding.

4 Claims, 2 Drawing Sheets

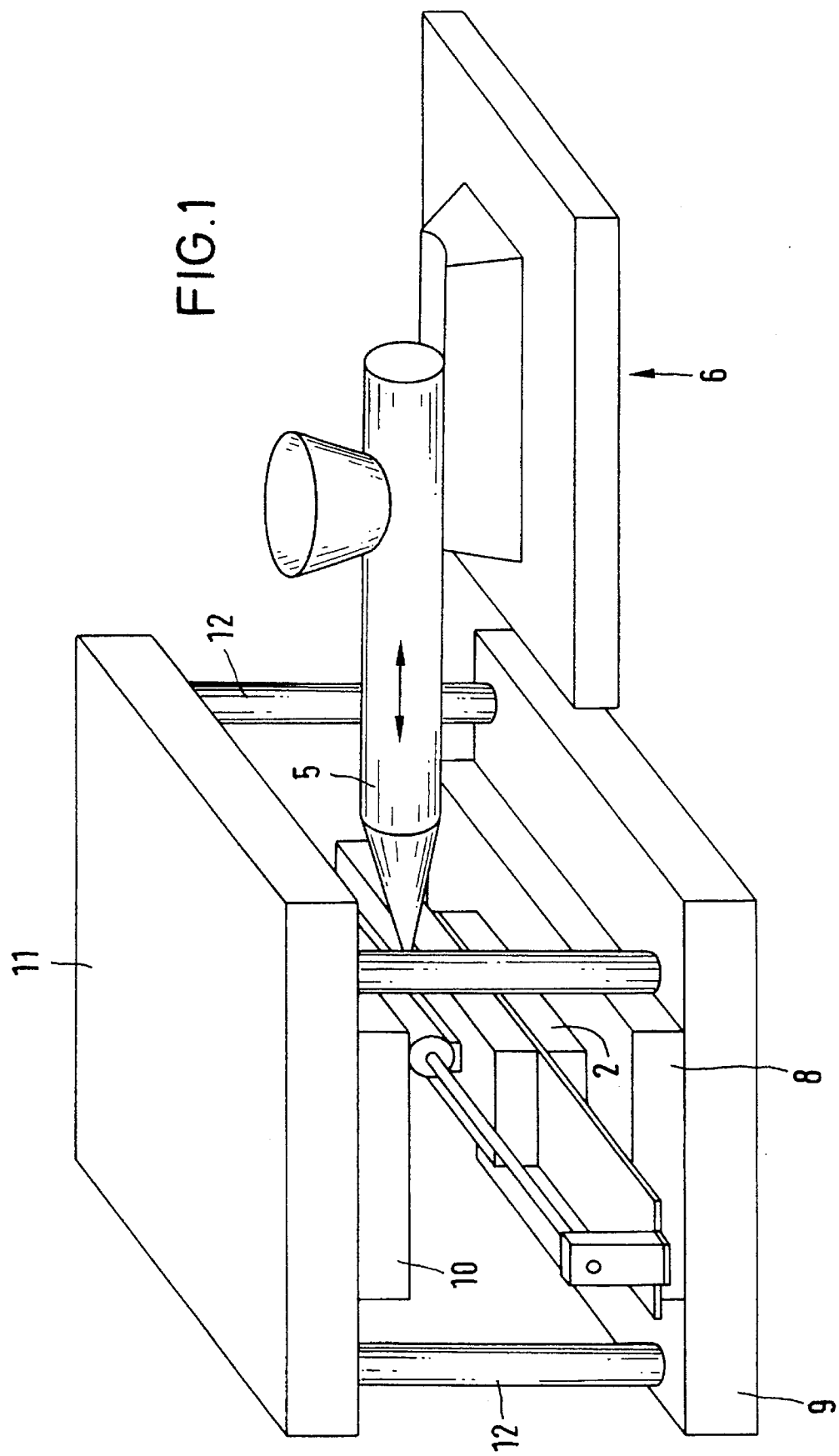

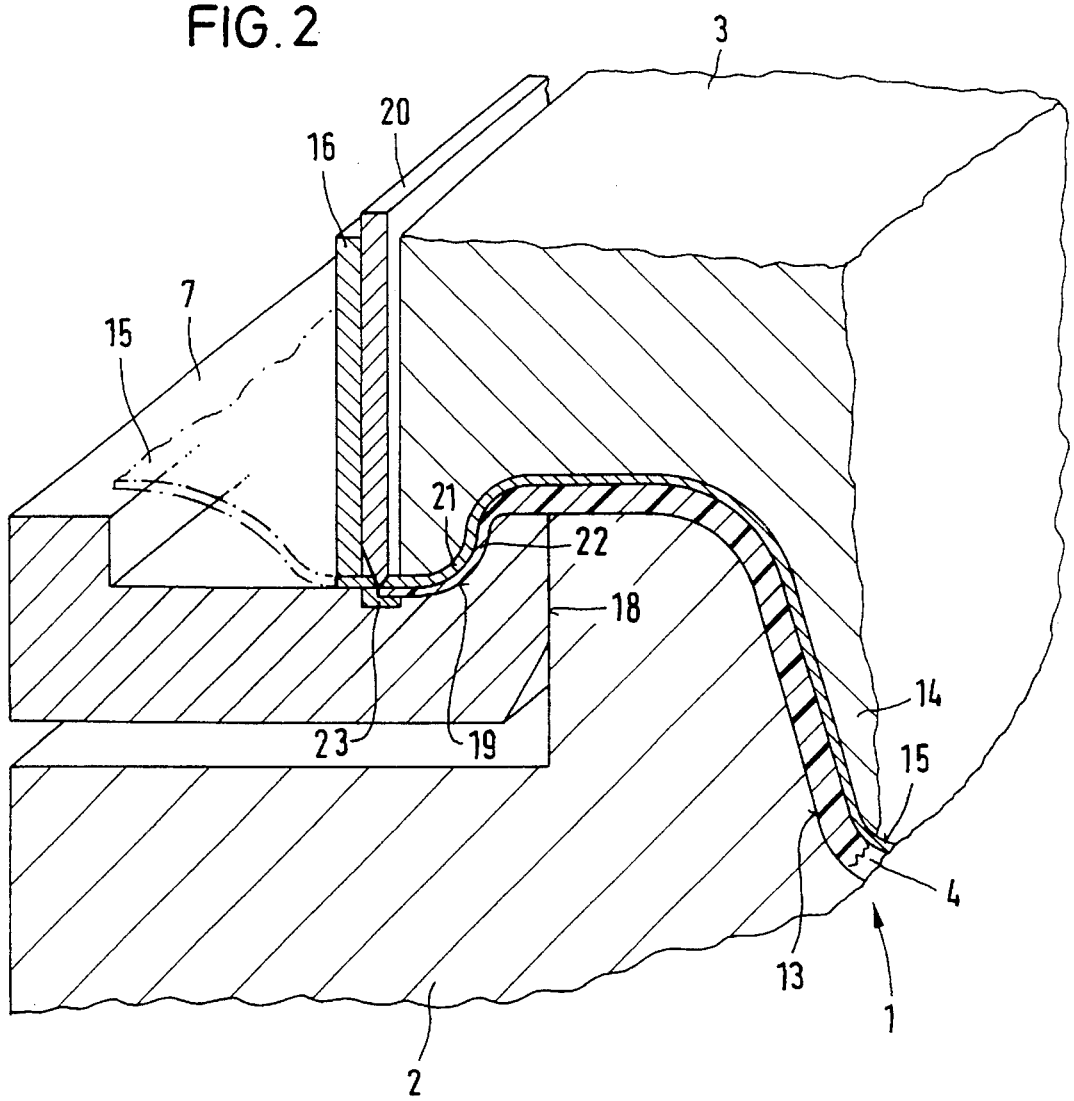
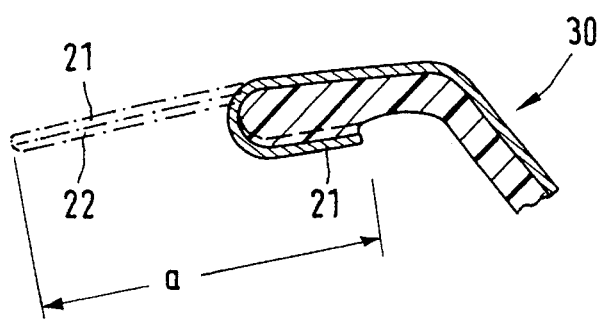

METHOD OF MANUFACTURING A PLASTIC MOLDING

This is continuation of application Ser. No. 08/088,835, filed on Jul. 8, 1993, now abandoned.

BACKGROUND OF THE INVENTION

The invention relates to a method of manufacturing a plastic molding having a web of decorative material as a covering. A plastic composition in a plasticized state is fed to an open mold cavity of a mold having upper and lower mold halves. The composition is compacted in shaping fashion by the closing of the mold halves against the web of decorative material arranged between the mold halves. The web of decorative material is dimensioned larger than the plastic molding. The resulting protrusion is wrapped around the edges of the molding after it is solidified.

One method of this type is known from EP-A- 0 480 153. Column 6, lines 16 to 19 of that publication refers to the formation of a turn-around or wrapping of the web of decorative material. Referring to FIG. 3 thereof, it is assumed that the protrusion of the web of decorative, material, which extends beyond an edge of the molding, is intended to be wrapped over after it has been cut and to then be adhered to the rear side of the molding. This assumption is confirmed by in-house tests. In that connection, it was found that the application of an adhesive and the production of an adhesive attachment is relatively laborious and expensive. Furthermore, dirtying of the resultant molding may easily result from the adhesive, and the adhesive may penetrate through the web of decorative material, especially if the web is formed of a textile.

SUMMARY OF THE INVENTION

The object of the present invention therefore is to improve this method of producing a wrapping or turn-over, in which the production of a clean wrap or turn-over is achieved with particularly simple means and at favorable expense.

To achieve this object, the plasticized plastic composition is pressed, at least in some regions protruding beyond the edges of the completed molding, also against the portion of the web of decorative material that protrudes beyond at least one edge of the plastic molding. This forms a skin of the plastic on the underside of the protruding portion of the decorative web. That skin is wrapped or turned over together with the protruding portion and welded either to the edge or the rear surface of the completed molding.

Performing the method of the invention requires only a slight change in the mold and of the welding operation to permit formation of the skin on the protruding portion of the web. This operation, however, is substantially faster and cleaner than a gluing method. It is preferable that the plastic material skin on the protrusion as well as on the edge or the rear surface of the molding in the region of the wrap or turn-over be heat treated and that the protrusion be wrapped or turned over together with the molded on skin and that the skin is thermally welded to the edge or the rear surface of the plastic molding. The welding is therefore effected by heat and pressure, which can be done with simple means such as a welding mirror and shaping rams but possibly also by mere manual application. The skin on the protrusion of the web of decorative material serves as a welding aid to assure an intimate bond of the web of decorative material to the molding in the region of the wrap or turn-over. The expression "skin" is to be understood in the broadest sense and comprises a layer in a thickness range of 0.2 to 3 mm, and preferably 0.5 mm. It can be said in general that the skin, on the one hand, should be sufficiently thin so as not to interfere with the turning over and wrapping and, on the other hand, thick enough to permit a reliable welding. A thermoplastic synthetic material is used for the molding. Polypropylene is considered particularly suitable since it can be excellently recycled.

Other objects and features of the present invention will become apparent from the following description of the invention which refers to the accompanying drawings.

BRIEF DESCRIPTION OF THE DRAWINGS

FIG. 1 is an overall perspective view of an apparatus for the production of plastic moldings;

FIG. 2 is a vertical partial section through the closed mold of FIG. 1;

FIG. 3 is a section through a plastic molding which has been shaped by compression, provided with a cover and with turn-over.

DETAILED DESCRIPTION OF THE INVENTION

The molding apparatus of FIGS. 1 and 2 has a mold 1 with a lower mold half 2 and an upper mold half 3, and a mold cavity 4 formed between the mold halves. The apparatus further comprises a plastic processing machine 6 having a plasticizing device 5 and means for feeding the plasticized plastic composition from the device 5 into the open mold cavity 4.

FIG. 2 shows a two part clamping frame having a lower clamping frame 7. The lower mold half 2 is seated on a lower clamping plate 8 which, in turn, is supported by a mold receiving plate 9. The upper mold half 3, which cannot be seen in FIG. 1, is seated on an upper clamping plate 10. That in turn is fastened to an upper mold receiving plate 11. Via column guides 12 the mold halves 2 and 3 can be moved relative to each other from an open position into the closed position shown in FIG. 2, and vice versa. The lower mold half 2 has a hollow space 13. The upper mold half has a core 14 which can be introduced into that space. The mold cavity 4 for the plastic molding is developed between the hollow space 13 and the core 14.

The clamping frame comprises the lower clamping frame half 7 and an upper clamping frame half. In the simplest case, the upper clamping frame half is formed from the upper mold half 3 and the web is at the upper mold half so that upon the closing of the mold 1, the web of decorative material 15 is disposed at one side of the composition in order to be molded to one surface of the molding and extends beyond the edge of the molding so that the web is clamped outside the cavity 4 between the upper mold half 3 (as upper clamping frame half) and the lower clamping frame half 7.

The embodiment shown in FIG. 2 includes a separately developed upper clamping frame half 16 which can be clamped, via control means (not shown), against the lower clamping frame half 7 in such a manner that the web blank of decorative material inserted between the clamping frames can slip during the molding process.

The lower clamping frame half 7 shown in FIG. 1 is formed with a dip edge 18 and a parting plane 19 spaced from it.

In the manufacture of a plastic molding, a plasticized plastic composition of a predetermined volume is placed in the hollow space 13 of the lower mold half 2. Thereupon, the upper mold half 3 and thus also the clamping frame, with the web of decorative material 15 previously clamped in place, is moved downward, which closes the mold. The web is thereby at one surface of the plastic in the mold. In this connection, the inserted plastic composition is shaped by compression, a process also known as displacement shaping.

FIG. 2 further shows that the device is provided with a cutting knife 20 in order to permit contour cutting of the plastic molding. The cutting knife 20 is mounted in the upper mold half 3 and can be positively controlled, for instance, by the opening movement of the mold. It is also possible to provide mechanical and/or hydraulic control means, not shown in detail, for the cutting knife 20. The cutting edge of the cutting knife 20 operates against an insert 23, which is inserted into the lower clamping frame half 7.

After the compacted plastic material has hardened, the plastic molding 30 is removed from the mold 1 and is provided with a wrap or turn-over shown in FIG. 3. To produce the turn-over, the web of decorative material 15 covering the plastic molding has a protrusion 21 beyond at least one edge of and possibly beyond all edges of the plastic molding. Thus, the web is longer than the plastic molding in one or all dimensions. At the protrusion, the molded plasticized plastic composition is continuous with the plastic molding and is pressed also against the protrusion 21. This provides the rear surface of the protrusion 21 with a skin like cover 22 of thermoplastic material which serves as a welding aid upon the formation of the wrap or turn-over.

FIG. 3 shows an end region of a plastic molding 30. The approximate shape of the plastic molding upon its removal from the mold 1 is indicated by dash-dot lines. The region designated a in FIG. 3 is heat treated (by a welding mirror, or the like) so that a superficial plasticizing of the plastic material takes place. The protrusion 21 is then turned over or wrapped and its plastic material skin is pressed against the rear of the plastic molding 30 to be thereby thermally welded. It is also or may alternatively only be thermally welded to the edge of the plastic molding. The final condition of the wrap or turn-over is shown in solid lines in FIG. 3. It is obvious that, for forming the wrap or turn-over auxiliary means such as slides and rams can be used, and that in mass production also correspondingly equipped devices can be used. It is evident that the plastic molding 30 may be of elongated, angular, or round shape and that the web of decorative material can be wrapped or turned around the plastic molding only at its longitudinal edges. However, it can also be wrapped or turned around all the edges of the plastic molding. In that case, it may be necessary to provide the protrusion 21 with incisions in the regions of sharp radii.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method of manufacturing a plastic molding having a web of material as a covering, comprising:

providing a plurality of relatively movable mold parts having an open position defining an open mold cavity for receiving a plasticized resin composition in its plasticized state and a closed position for compacting the composition in the mold cavity to shape the plastic molding, the mold cavity in the closed position having first and second portions, the second portion extending in at least one direction from the first portion and being thinner than the first portion;

feeding a plasticized resin composition in its plasticized state into the open mold cavity defined between the relatively movable mold parts;

placing the web in the cavity with the resin composition at one side of the web;

the web being longer in at least one dimension than the plastic molding to be molded so that the web has a protrusion beyond at least one edge of the plastic molding, the web being placed in the cavity so that the protrusion is located to be in the second portion of the mold cavity;

closing the relatively movable mold parts over the resin composition to compact the composition between the mold parts and also against the web of material in the mold cavity to shape the plastic molding in the first portion of the mold cavity, and to form a skin of the resin on the protrusion at the same side of the web as the resin composition;

turning over and wrapping the protrusion of the web with the skin on it around the respective edge of the molding and welding the protrusion and the skin to the respective edge or the rear of the plastic molding by subjecting both the skin on the protrusion and the edge or the rear of the molding to which the skin is to be welded to a heat treatment in the region of the wrap over, then turning the protrusion and the skin over the molding and then heat welding the skin to the edge or rear of the molding.

2. The method of claim 1, wherein the web is of such a size and shape and so placed in the mold that there is protrusion of the web beyond more than one edge of the resin molding, the plastic composition is compression molded to the protrusion at least in regions beyond the more than one edge of the plastic molding and the protrusion is wrapped around and turned over the more than one edge of the plastic molding and welded to those edges or the rear of the molding.

3. The method of claim 1, wherein the protrusion is turned around and wrapped around the edge of the molding after the resin composition has been hardened.

4. The method of claim 1, wherein the web of material is a web of decorative material for application to the exterior surface of the plastic molding.

* * * * *

UNITED STATES PATENT AND TRADEMARK OFFICE
CERTIFICATE OF CORRECTION

PATENT NO. : 5,565,053
DATED : October 15, 1996
INVENTOR(S) : Happich

It is certified that error appears in the above-indentified patent and that said Letters Patent is hereby corrected as shown below:

On the title page: Item [73] Assignee's should read -- Gebr Happich, Wuppertal, Germany and Schade KG, Plettenberg, Germany --.

Signed and Sealed this

Eighth Day of April, 1997

*Attest:*

BRUCE LEHMAN

*Attesting Officer*     *Commissioner of Patents and Trademarks*